(12) United States Patent
Terauchi et al.

(10) Patent No.: US 11,201,373 B2
(45) Date of Patent: Dec. 14, 2021

(54) BATTERY MODULE AND VEHICLE EQUIPPED WITH SAME

(71) Applicant: SANYO Electric Co., Ltd., Daito (JP)

(72) Inventors: Shinobu Terauchi, Hyogo (JP); Kengo Ishibashi, Hyogo (JP); Shinichi Mitsubori, Kanagawa (JP)

(73) Assignee: SANYO Electric Co., Ltd., Daito (JP)

( * ) Notice: Subject to any disclaimer, the term of this patent is extended or adjusted under 35 U.S.C. 154(b) by 135 days.

(21) Appl. No.: 16/635,022

(22) PCT Filed: Jul. 18, 2018

(86) PCT No.: PCT/JP2018/026898
§ 371 (c)(1),
(2) Date: Jan. 29, 2020

(87) PCT Pub. No.: WO2019/031169
PCT Pub. Date: Feb. 14, 2019

(65) Prior Publication Data
US 2020/0243816 A1    Jul. 30, 2020

(30) Foreign Application Priority Data

Aug. 7, 2017  (JP) .............................. JP2017-152372

(51) Int. Cl.
*H01M 50/20* (2021.01)
(52) U.S. Cl.
CPC ........ *H01M 50/20* (2021.01); *H01M 2220/20* (2013.01)
(58) Field of Classification Search
None
See application file for complete search history.

(56) References Cited

U.S. PATENT DOCUMENTS

| 5,766,801 A | 6/1998 | Inoue et al. |
| 2007/0026305 A1 | 2/2007 | Jeon et al. |
| 2013/0273404 A1 | 10/2013 | Ochi et al. |
| 2017/0062783 A1 | 3/2017 | Kim et al. |

FOREIGN PATENT DOCUMENTS

| JP | 9-120808 A | 5/1997 |
| JP | 2007-42648 A | 2/2007 |
| JP | 2012-256466 A | 12/2012 |
| JP | 2013-55070 A | 3/2013 |
| JP | 2015-225700 A | 12/2015 |
| JP | 2017-123336 A | 7/2017 |
| WO | 2012/057322 A1 | 5/2012 |

OTHER PUBLICATIONS

International Search Report dated Sep. 4, 2018, issued in counterpart Application No. PCT/JP2018/026898 (2 pages).

*Primary Examiner* — Wyatt P McConnell
(74) *Attorney, Agent, or Firm* — Westerman, Hattori, Daniels & Adrian, LLP (57) ABSTRACT

A battery module includes a battery stack that includes a plurality of prismatic battery cells stacked in a direction along their thicknesses, the pair of end plates disposed respectively at end faces of the battery stack that face in a stacked direction, bind bars that are disposed respectively on side faces of the battery stack and bind the pair of end plates together, and a plurality of securing pins fixing the bind bars over sides of each of the end plates. A pair of the plurality of securing pins are fixed respectively to the sides of each of the end plate to face each other and are coaxial with each other. Each of the end plate includes a horizontal rib extending coaxially with each of the plurality of securing pins.

10 Claims, 10 Drawing Sheets

BATTERY MODULE AND VEHICLE EQUIPPED WITH SAME

TECHNICAL FIELD

The present invention relates to a battery module that includes bind bars connecting end plates disposed respectively at ends of a battery stack which includes a plurality of stacked prismatic battery cells. The present invention also relates to a vehicle including this battery module.

BACKGROUND ART

A typical battery module includes a battery stack including a plurality of prismatic battery cells, a pair of end plates disposed respectively at end faces of the battery stack, and bind bars connecting the pair of end plates (refer to PTL 1). The battery stack of this battery module is bound by the end plates and the bind bars, so that expansion of the prismatic battery cells of the battery stack can be suppressed.

On the other hand, with recent demand for a battery module having a higher energy density per volume and a higher energy density per weight, even prismatic battery cells having a higher energy density per volume and a higher energy density per weight are desirably adopted for a battery module.

CITATION LIST

Patent Literature

PTL 1: International Publication No. WO 2012/057322

SUMMARY OF THE INVENTION

Technical Problem

When having the higher energy density per volume and the higher energy density per weight, the prismatic battery cells tend to experience a great dimensional change associated with charge and discharge or degradation. In order to suppress expansion of the prismatic battery cells that experience a great dimensional change associated with charge and discharge or degradation, the prismatic battery cells need to be bound together with relatively great force.

However, each of the end plates of the battery module described in PTL 1 is composed of a plastic body part and a metal plate made of, for example, aluminum. When great force is applied, the body part is likely to be damaged, or the metal plate is likely to be deformed. If the end plates are damaged or deformed, the expansion of the prismatic battery cells cannot be suppressed.

The present invention has been developed for the purpose of solving the above drawback, and one object of the present invention is to provide a technique that suppresses expansion of prismatic battery cells by use of sufficiently strong end plates.

Solution to Problem

A battery module according to an aspect of the present invention includes a battery stack that includes a plurality of prismatic battery cells stacked in a direction along their thicknesses, a pair of end plates disposed respectively at end faces of the battery stack that face in a stacked direction, bind bars that are disposed respectively on side faces of the battery stack and bind the pair of end plates together, and a plurality of securing pins fixing the bind bars over sides of each of the pair of end plates. A pair of the plurality of securing pins are fixed respectively to the sides of each of the pair of end plates to face each other and are coaxial with each other. Each of the pair of end plates includes a horizontal rib extending coaxially with each of the plurality of securing pins.

A vehicle including the battery module with the constituent elements according to the above aspect includes the battery module, a traction motor that is supplied with electric power from the battery module, a vehicle body mounted with the battery module and the motor, and a wheel that is driven by the motor to run the vehicle body.

According to the above-described battery module, the horizontal rib extending coaxially with the securing pins, which are fixed respectively to the sides of the end plate to fix the bind bars, is provided to the end plate, thus effectively enabling the end plate to have improved strength. Rigidity of the horizontal rib extending coaxially with the securing pins disposed respectively on the sides can particularly increase strength against horizontal bending. When experiencing cell reaction force of the battery stack, the end plate pulls the bind bars in an expanding direction of the prismatic battery cells. Through reaction to this force, horizontal bending stress acts on the end plate. This bending stress becomes the greatest on a line connecting a connection point between the securing pin and the bind bar that are positioned on one of the sides of the end plate, and a connection point between the securing pin and the bind bar that are positioned on the other side of the end plate. The horizontal rib is provided to extend coaxially with the securing pins that are fixed respectively to the sides of the above end plate and thus can be the most effective reinforcement against bending stress that acts on the end plate through reaction to cell reaction force. Consequently, deformation of the end plate can be suppressed.

DESCRIPTION OF EMBODIMENTS

A description is provided first of a point on which the present invention focuses. A battery module including a plurality of prismatic battery cells has end plates disposed respectively at end faces of a battery stack that includes the plurality of stacked prismatic battery cells. The pair of end plates are connected by bind bars, so that the battery stack is immobilized with pressure being applied to the battery stack in a stacked direction. In this battery module, the pair of end plates apply the pressure to the end faces of the battery stack to immobilize the battery stack and therefore are required to be sufficiently strong. The end plates experience cell reaction force at their respective inner surfaces when the prismatic battery cells expand during charge and discharge. The end plates are pressed from inside by the expanding battery stack, thus experiencing the cell reaction force that is proportional to a product of an area of the battery stack and pressing force of the battery stack. Therefore, those prismatic battery cells experiencing a great dimensional change associated with, for example, charge and discharge cause the cell reaction force as great as their expansion to act on the end plates. The cell reaction force that acts on the end plates is, for example, as extremely great as several tons in a battery module which is used as a power source to drive a traction motor of a vehicle. Therefore, what is needed to obtain a battery module with high energy density is to provide end plates that are strong enough to suppress deformation even when such extremely great force is applied.

On the other hand, the end plates are required to have both characteristics of being strong and lightweight. For this reason, when the end plate is manufactured, there are cases where a thick plate is molded out of plastic and has an outer surface on which a metal plate made of, for example, aluminum is stacked, or cases where the end plate is molded entirely out of, for example, aluminum or plastic. The plastic part of the end plate has low strength, and even the metal plate does not have high strength against bending deformation. For this reason, while this end plate can be used in a battery module with insignificant cell reaction force, this end plate cannot deliver sufficient strength in a battery module with great cell reaction force. The end plate that is not sufficiently strong gets deformed by the great cell reaction force. When deformed, the end plate causes a change to relative positions of the prismatic battery cells to which the end plates apply the pressure to immobilize. The prismatic battery cells have bus bars that are thick metal plates fixed to electrode terminals, and are connected in series or parallel via the bus bars. When the shift is caused to the relative positions, excessive straining force acts on those parts where the electrode terminals connect with the bus bars. The straining force damages the parts where the electrode terminals connect with the bus bars and also damages parts where the electrode terminals connect with an exterior case of each of the prismatic battery cells. With end plates having sufficient strength, the shift that may be caused to the relative positions of the prismatic battery cells can be improved. By being entirely a metal block made of, for example, an iron alloy, the end plate can have the sufficient strength.

However, the end plate having this structure is very heavy, consequently causes a decline in energy density of a battery module and thus cannot be put to practical use. The end plate is required to have high strength while being lightweight. However, the characteristic of being lightweight and the characteristic of being strong are contrary to each other, so that it has been very difficult to achieve both these characteristics. When the above facts are taken into account, optimization of a shape of the end plate which is the metal block and study of a shape for effective suppression of deformation of the end plate are important.

A battery module according to an aspect of the present invention may be specified by the following structure. The battery module includes battery stack 2 that includes a plurality of prismatic battery cells 1 stacked in a direction along their thicknesses, a pair of end plates 3 disposed respectively at end faces of battery stack 2 that face in a stacked direction, bind bars 4 that are disposed respectively on side faces of battery stack 2 and bind the pair of end plates 3 together, and a plurality of securing pins 5 fixing bind bars 4 over sides of each of the pair of end plates 3. A pair of the plurality of securing pins 5 are fixed respectively to the sides of each of the pair of end plates 3 of the battery module to face each other and are coaxial with each other. Each of the pair of end plates 3 includes horizontal rib 13 extending coaxially with each of the plurality of securing pins 5.

Horizontal rib 13 of each of the pair of end plates 3 may include, at each of its ends, boss 13X allowing insertion of each of the plurality of securing pins 5. Boss 13X may include joining hole 13A allowing insertion of each of the plurality of securing pins 5. Each of the plurality of securing pins 5 may be passed through each of bind bars 4 and may be inserted in joining hole 13A to connect each of bind bars 4 to each of the pair of end plates 3. In the above structure, the securing pins are each inserted in the joining hole of the boss provided at each of the ends of the horizontal rib, so that the pair of securing pins disposed coaxially with each other can be connected in alignment with each other via the horizontal rib. In this way, the pair of bind bars positioned respectively at the sides of the end plate can be firmly connected via the horizontal rib and the securing pins.

Each of the pair of end plates 3 may include a plurality of horizontal ribs 13 paralleling each other with a plurality of the pairs of the plurality of securing pins 5 fixed to the sides of each of the pair of end plates 3. According to the above structure, the plurality of the horizontal ribs provided to the end plate can deliver increased strength against bending. Moreover, each of the bind bars can be connected by the securing pins at vertically separated positions of each of the sides of the end plate.

Each of the pair of end plates 3 may also include facing plate part 11 having an outline substantially identical with a shape of each of the end faces of battery stack 2, and peripheral wall 12 projecting from four sides of facing plate part 11 along the stacked direction of the plurality of prismatic battery cells 1. Each of the pair of end plates 3 may be substantially box-shaped as a whole. According to the above structure, the end plate is box-shaped, being provided with the peripheral wall along the four sides of the facing plate part. Therefore, taking advantage of high rigidity of its shape like a box, the end plate can deliver superior strength.

Peripheral wall 12 of the end plate may include side walls 12A connected respectively to side edges of facing plate part 11, top wall 12B connected to an upper edge of facing plate part 11, and bottom wall 12C connected to a lower edge of facing plate part 11. Horizontal rib 13 may protrude from facing plate part 11 along the stacked direction of the plurality of prismatic battery cells 1 and may connect with side walls 12A at its ends. Each of side walls 12A may include joining hole 13A allowing insertion of each of the plurality of securing pins 5. According to the above structure, the ends of the horizontal rib protruding from the facing plate part are connected respectively to the side walls of the peripheral wall on an inner side of the peripheral wall surrounding along the four sides of the facing plate part. Therefore, the rigidity increases, enabling more effective improvement of the strength of the end plate.

Each of the pair of end plates 3 may also include vertical rib 15 that extends vertically and intersects horizontal rib 13. By including the vertical rib that extends vertically and intersects the horizontal rib, the above structure can also deliver superior strength against vertical bending in addition to the strength against widthwise bending.

The battery module may also include fixing bolt 6 fixing each of the pair of end plates 3 to base plate 9 disposed at a bottom face of the battery module. Vertical rib 15 may include insertion hole 15A passing through vertical rib 15 along an axis of vertical rib 15. Fixing bolt 6 may be inserted in insertion hole 15A of vertical rib 15 to fix each of the pair of end plates 3 to base plate 9. According to the above structure, the fixing bolt is inserted in the insertion hole of the vertical rib and fixes the end plate to the base plate disposed at the bottom face of the battery module, so that the vertical rib reinforcing the end plate also serves as a member allowing insertion of the fixing bolt. Without a special insertion member, the battery module can be effectively connected to the base plate with manufacturing costs reduced.

Horizontal rib 13 of each of the pair of end plates 3 may include, at each of its ends, joining hole 13A allowing insertion of each of the plurality of securing pins 5. Insertion hole 15A of vertical rib 15 and joining hole 13A of horizontal rib 13 may be positioned in an identical plane. Joining hole 13A may pass through and reach insertion hole 15A. According to the above structure, with the insertion hole of the vertical rib and the joining hole of the horizontal rib being disposed in the identical plane, the insertion hole and the joining hole can be positioned in close proximity to each other along the stacked direction of the prismatic battery cells. This enables the end plate to have a reduced thickness. With the joining hole passing through and reaching the insertion hole, the insertion hole can be positioned in close proximity to the joining hole. In other words, the insertion hole can be disposed about each of the sides of the end plate.

Each of the pair of end plates 3 may be cast in aluminum or an aluminum alloy.

According to another aspect, a vehicle may include any one of above-described battery modules 10, 20, traction motor 93 that is supplied with electric power from battery module 10, 20, vehicle body 90 mounted with battery module 10, 20 and motor 93, and wheel 97 that is driven by motor 93 to run vehicle body 90.

Exemplary embodiments of the present invention are hereinafter described with reference to the drawings. It is to be noted, however, that the exemplary embodiments described below are illustrations each embodying a technical idea of the present invention, and the present invention is not specifically limited to the following exemplary embodiments. Those members described in the claims of this specification are not specifically limited to members described in the exemplary embodiments. Unless otherwise specified, particulars including dimensions, materials, shapes, and relative positions of the members described in each of the exemplary embodiments are described as being mere examples and not as being restrictive of the present invention. The sizes, the relative positions, and others of the members may be illustrated exaggeratedly in the drawings for clear explanation. Members that are identical or of the same quality have the same name and the same reference mark in the following description, and detailed descriptions of these members are omitted where appropriate. A single member may be configured to serve as a plurality of elements of the present invention. On the other hand, a function of a single element of the present invention may be achieved by a plurality of members. Contents described in some examples or some of the exemplary embodiments can be used, for example, in other examples or exemplary embodiments.

First Exemplary Embodiment

Figure 1:
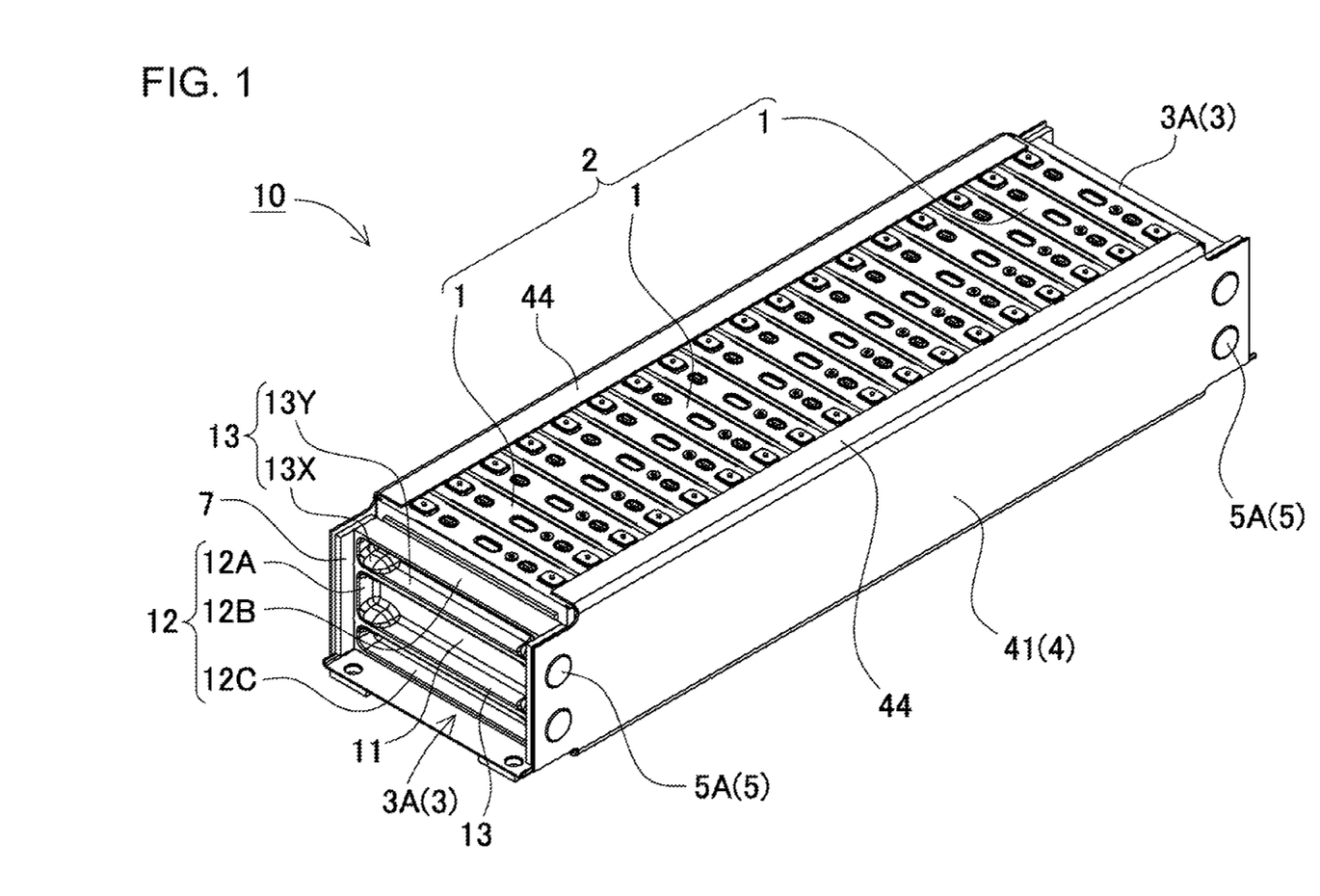
FIG. 1 is a perspective view of a battery module according to a first exemplary embodiment of the present invention.
Figure 2:
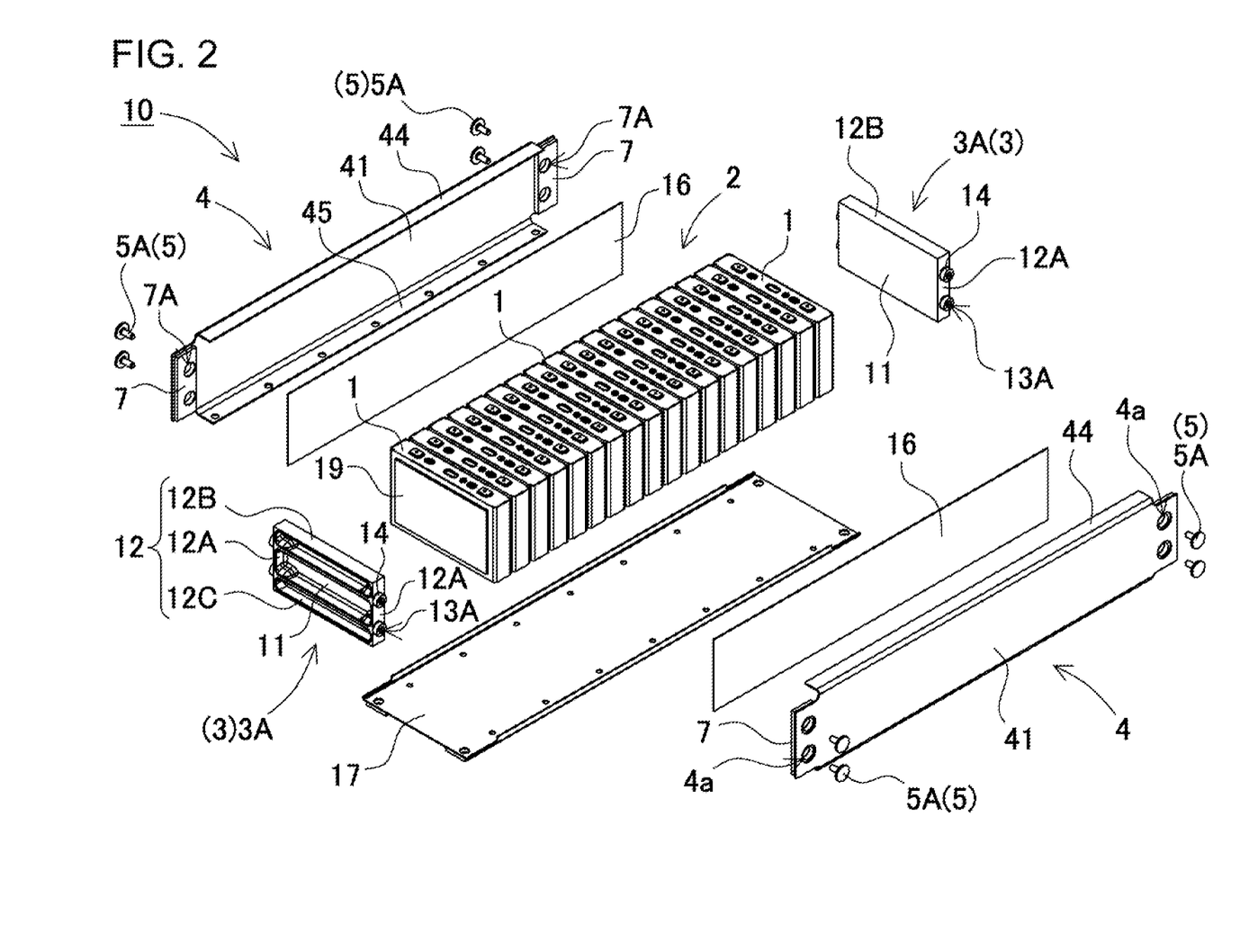
FIG. 2 is an exploded perspective view of the FIG. 1 battery module.
Figure 3:
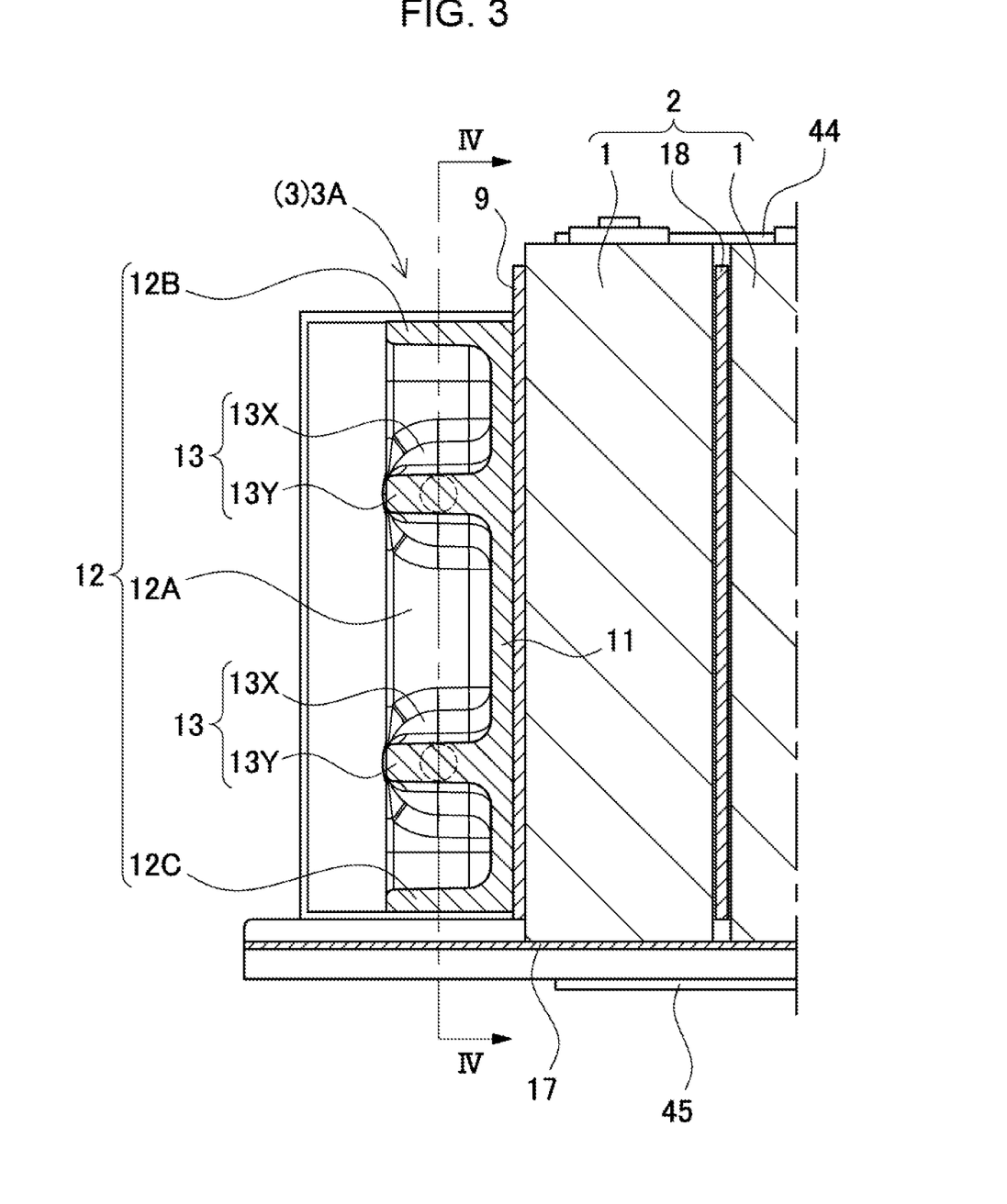
FIG. 3 is an enlarged vertical section of an end plate of the FIG. 1 battery module and corresponds to a section taken along line III-III in FIG. 4.
Figure 4:
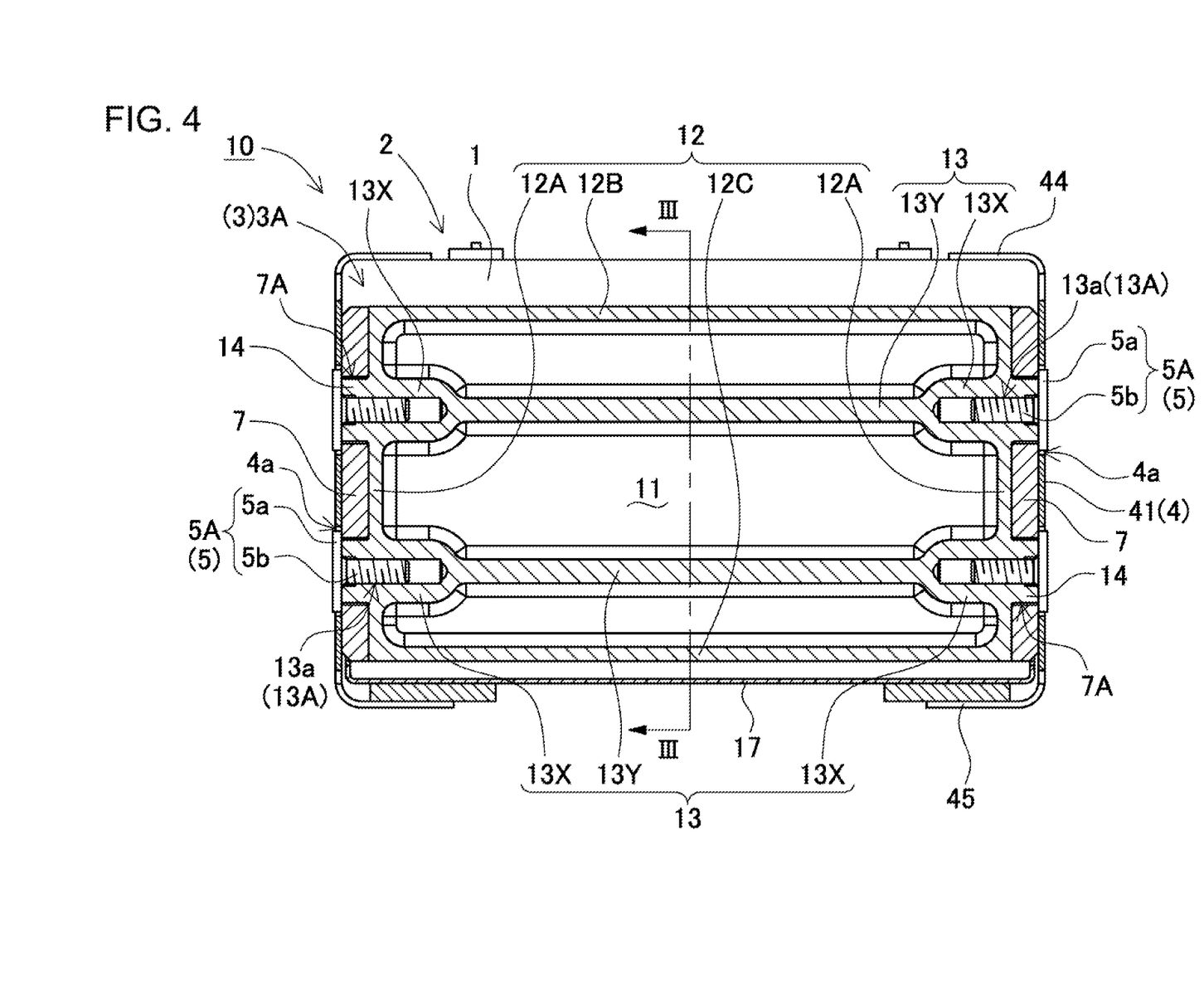
FIG. 4 is an enlarged horizontal section of the end plate of the FIG. 1 battery module and corresponds to a section taken along line IV-IV in FIG. 3.

FIGS. 1 to 4 illustrate a battery module according to the first exemplary embodiment. FIG. 1 is a perspective view of the battery module. FIG. 2 is an exploded perspective view of the battery module. FIG. 3 is a vertical, longitudinal section of an end of the battery module taken on a vertical plane. FIG. 4 is a horizontal section of the battery module's end taken on a horizontal plane. In this specification, a vertical direction corresponds with a vertical direction in the drawings, and a side-to-side direction corresponds with a side-to-side direction in the drawings and refers to a horizontal direction orthogonal to the stacked direction of battery cells.

Battery module 10 illustrated in these drawings includes battery stack 2 that includes a plurality of prismatic battery cells 1 stacked with each of separators 18 made of insulating material being put between prismatic battery cells 1, a pair of end plates 3 holding battery stack 2 in position respectively at end faces of battery stack 2, bind bars 4 connecting the pair of end plates 3, and securing pins 5 fixing bind bars 4 over sides of each of end plates 3. As illustrated in FIG. 2, battery module 10 may structurally have insulating sheet 16 interposed between each of bind bars 4 and battery stack 2 and may structurally include bottom plate 17 under battery stack 2 and end plates 3 for insulation of battery stack 2 and end plates 3.

As illustrated in FIG. 1, above battery module 10 has the shape of an elongated box as a whole. The plurality of prismatic battery cells 1 are stacked to form battery stack 2. Battery stack 2 is held by end plates 3 at its end faces facing in the stacked direction, and each of bind bars 4 connects end plates 3 at its ends. Thus battery stack 2 is immobilized with pressure being applied to battery stack 2. Battery stack 2 has those stacked prismatic battery cells 1 connected in series, in parallel, or in series and parallel via bus bars (not illustrated) that are metal plates.

(Prismatic Battery Cell 1)

Each of prismatic (or rectangular) battery cells 1 illustrated has a greater width than its thickness, that is to say, has the thickness that is small compared with its width. Prismatic battery cells 1 are stacked along their thicknesses, forming battery stack 2. Prismatic battery cell 1 is a lithium-ion rechargeable battery. However, the prismatic battery cell may even be any other secondary battery that can be charged, such as a nickel metal hydride battery or a nickel-cadmium battery. Prismatic battery cell 1 has a positive and a negative electrode plate housed together with an electrolyte in a hermetically sealed exterior can. The exterior can is made by pressing a sheet of metal such as aluminum or an aluminum alloy into a prism and has an opening sealed with a seal plate to be airtight. The seal plate is made of aluminum or an aluminum alloy as with the exterior can and includes a positive and a negative electrode terminal fixed to its ends, respectively. The seal plate also includes a gas discharge valve between the positive and negative electrode terminals.

The respective thicknesses of the plurality of stacked prismatic battery cells 1 that form battery stack 2 are aligned in the stacked direction. Respective terminal surfaces of the plurality of stacked prismatic battery cells 1 forming battery stack 2 are each provided with the positive electrode terminal and the negative electrode terminal and are disposed on the same plane.

(Separator 18)

Battery stack 2 illustrated in FIGS. 3 and 4 has separators 18 that are each put between stacked prismatic battery cells 1. Separator 18 illustrated is made of the insulating material to have the shape of a thin plate or a sheet. Illustrated separator 18 is plate-shaped, has substantially the same size as a counterface of prismatic battery cell 1 and is stacked between adjacent prismatic battery cells 1, thus providing insulation between adjacent prismatic battery cells 1. In addition to separator 18, a second spacer may be disposed between adjacent prismatic battery cells 1. If the spacer to use is shaped to form with prismatic battery cell 1 a passage for cooling gas, prismatic battery cell 1 can be cooled. Prismatic battery cell 1 may even be surfaced with an insulating material. A shrink tube made of, for example, polyethylene terephthalate (PET) resin may be thermally welded to a surface of the exterior can so as to exclude an electrode part of the prismatic battery cell.

(Battery Stack 2)

With the positive electrode terminals and the negative electrode terminals of adjacent prismatic battery cells 1 connected to the metal bus bars (not illustrated), the plurality of prismatic battery cells 1 of battery stack 2 are connected in series, in parallel, or in series and parallel via the bus bars. Illustrated battery stack 2 has 18 prismatic battery cells 1 connected in series. However, the present invention does not specify how many prismatic battery cells the battery stack has and how these prismatic battery cells are connected.

Battery stack 2 has end-face spacer 19 sandwiched between each of its end faces and each of end plates 3. As FIG. 2 illustrates, end-face spacer 19 disposed between battery stack 2 and end plate 3 insulates end plate 3 from battery stack 2. End-face spacer 19 may be made of a material similar to the material for above-mentioned separator 18.

(End Plate 3)

End plates 3 are each disposed outwardly of end-face spacer 19 and pinch battery stack 2 respectively at ends of battery stack 2 that face in the stacked direction of prismatic battery cells 1. The pair of end plates 3 disposed respectively at the ends of battery stack 2 are connected to and bound together by bind bars 4 that are disposed respectively along side faces of battery stack 2. As illustrated in FIGS. 2 and 4, bind bars 4 are each connected to each of end plates 3 by means of securing pins 5 over each side of end plate 3. When fixed respectively to the sides of end plate 3, securing pins 5 facing each other are positioned coaxially with each other. In the FIG. 2 example, bind bars 4 are connected to end plate 3 by means of securing pins 5 that are four in total, with two securing pins 5 being provided along each of the sides of end plate 3.

The pair of end plates 3 disposed respectively at the ends of battery stack 2 are connected to bind bars 4 and hold battery stack 2 while applying the pressure to battery stack 2, so that the pair of end plates 3 experience cell reaction force when prismatic battery cells 1 expand. In order to be strong enough to withstand the cell reaction force, each of end plates 3 illustrated in FIGS. 1 to 4 is formed integrally and entirely of a metal and has an optimized shape, thus achieving weight reduction. Illustrated end plates 3A each include facing plate part 11 facing the end face of battery stack 2, and horizontal ribs 13 are formed integrally with facing plate part 11, protruding from facing plate part 11 along the stacked direction of prismatic battery cells 1 and extending horizontally. Each of horizontal ribs 13 extends coaxially with the pair of securing pins 5 that are fixed respectively to the sides of end plate 3A to face each other.

Each horizontal rib 13 includes, at each of its ends, boss 13X that allows insertion of securing pin 5. Boss 13X is provided with joining hole 13A in which securing pin 5 is inserted. Each horizontal rib 13 illustrated in FIG. 4 includes bosses 13X provided respectively at its ends, and connective part 13Y connecting these bosses 13X. Horizontal rib 13 has an overall length that is substantially equal to a width of facing plate part 11. Joining hole 13A that allows insertion of a shank of securing pin 5 is bored into boss 13X along an axis of boss 13X. Therefore, when seen in a plane perpendicular to its axis, boss 13X has a larger outline than the shank of securing pin 5, that is to say, is thicker than the shank of securing pin 5. Connective part 13Y is not hollow and connects integrally with facing plate part 11. By having an increased protruding height along the stacked direction of prismatic battery cells 1 and a decreased thickness, this connective part 13Y is lighter in weight and has increased strength against bending in a horizontal plane.

As illustrated in FIGS. 3 and 4, end plate 3A includes the plurality of parallel horizontal ribs 13 and is connected to bind bars 4 with the pairs of securing pins 5 fixed to its sides. As illustrated in FIG. 4, end plate 3A includes two vertically separated horizontal ribs 13. The two pairs of securing pins 5 that each face mutually respectively at the sides of end plate 3A are passed through bind bars 4 and are inserted in joining holes 13A of the ends of horizontal ribs 13, thus connecting bind bars 4. The plurality of horizontal ribs 13 provided to end plate 3A in this structure can deliver increased strength against bending. Bind bars 4 are fixed respectively at the ends of each of horizontal ribs 13, so that the most effective reinforcement can be achieved against bending stress that acts, through reaction to cell reaction force, on end plate 3A from bind bars 4. Although illustrated end plate 3A includes two horizontal ribs 13, the end plate is not limited to the two horizontal ribs. One horizontal rib or three or more horizontal ribs may be provided to the end plate. However, the horizontal rib is positioned coaxially with the securing pins in all cases and are never positioned not to be coaxial with the securing pins.

End plate 3A illustrated in FIGS. 2 to 4 includes facing plate part 11 that has a rectangular outline substantially identical with a shape of the end face of battery stack 2, and peripheral wall 12 projecting from four sides of facing plate part 11 along the stacked direction of prismatic battery cells 1. Peripheral wall 12 includes side walls 12A connected respectively to side edges of facing plate part 11, top wall 12B connected to an upper edge of facing plate part 11, and bottom wall 12C connected to a lower edge of facing plate part 11. Left and right side walls 12A and vertically positioned top and bottom walls 12B and 12C of peripheral wall 12 have their side edges connected, so that peripheral wall 12 has the shape of a rectangular frame. By having facing plate part 11 and peripheral wall 12, this end plate 3A is substantially box-shaped as a whole and thus has increased rigidity as a whole.

Illustrated end plate 3A is provided with two horizontal ribs 13 on an inner side of peripheral wall 12. The two horizontal ribs are parallel to vertically positioned top and bottom walls 12B and 12C and are spaced a predetermined distance away from each other. Each of horizontal ribs 13 formed on the inner side of peripheral wall 12 connects integrally with side walls 12A at its ends. In FIG. 4, boss 13X formed at each end of horizontal rib 13 connects integrally with side wall 12A of end plate 3A, and a terminal end of boss 13X projects from a surface of side wall 12A to serve as projection 14, with joining hole 13A opening at a leading surface of projection 14 and being exposed at the side of end plate 3A. Projections 14 projecting from the sides of illustrated end plate 3A are substantially cylindrical and are each connected to reinforcement 7 (described in detail later) that is fixed to an inner surface of bind bar 4. Illustrated reinforcement 7 includes joining recesses 7A that each allow insertion of projection 14. Projection 14 is inserted in joining recess 7A, so that end plate 3A is connected in place to bind bar 4.

In FIG. 4, facing the side of end plate 3A of battery module 10, the inner surface of each end of bind bar 4 is provided with reinforcement 7. Therefore, end plate 3A has a side-to-side width that is smaller than the width of prismatic battery cell 1. To be precise, the side-to-side width of end plate 3A is smaller by thicknesses of reinforcements 7 disposed respectively at the sides of end plate 3A. For a battery module using bind bars with no reinforcements, a side-to-side width of an end plate may be equal to a width of a prismatic battery cell. In this case, sides of the end plate are flat sides that are each provided with joining holes without having projections. As FIG. 3 illustrates, a vertical height of the end plate is slightly smaller than a height of prismatic battery cell 1 so that no part of end plate 3A faces an upper and a lower end of prismatic battery cell 1. Thus the seal-plate-end upper end of prismatic battery cell 1 and the part of prismatic battery cell 1 that faces a bottom of the exterior can are prevented from being pressed hard by reaction of end plate 3A that is caused when end plate 3A is pressed due to cell reaction force. A purpose of this is to prevent damage to a part where the exterior can is joined to the seal plate, which covers the opening of the exterior can of prismatic battery cell 1, and damage to the bottom of the exterior can.

Above end plate 3 is cast in aluminum or an aluminum alloy. Available examples of the aluminum alloy include Al—Cu—Mg alloys, Al—Cu—Ni—Mg alloys, Al—Cu—Si alloys, Al—Si—Mg alloys, Al—Si—Cu alloys, Al—Si—Cu—Mg alloys, and Al—Si—Cu—Ni—Mg alloys. The aluminum alloy used to make end plate 3 is a heat treatable alloy. End plate 3 made of the aluminum alloy is die-cast. End plate 3 made of the aluminum alloy is preferably tempered by a heat treatment that includes solution treatment, quenching, and ageing treatment.

(Securing Pin 5)

Securing pin 5 is inserted in joining hole 13A formed in each end of horizontal rib 13 of end plate 3, thus fixing bind bar 4. In FIG. 4, battery module 10 has bolts 5A serving as securing pins 5. Therefore, each of the ends of horizontal rib 13 is provided with, as joining hole 13A, female threaded hole 13a into which male thread 5b of bolt 5A is screwed. Female threaded hole 13a provided extends axially from an end face. Each bolt 5A is passed through bind bar 4 and is screwed into female threaded hole 13a, thus fixing bind bar 4 to end plate 3. However, the securing pin does not need to be screwed as the bolt. The securing pin may be press-fitted into the joining hole of the horizontal rib to be fixed or may be a weld bolt.

(Bind bar 4)

The pair of bind bars 4 respectively cover the side faces of battery stack 2 and bind end plates 3 together respectively at the side faces of battery stack 2. Each of bind bars 4 includes bind-bar principal surface 41 sized to substantially cover the side face of battery stack 2. Bind-bar principal surface 41 is flat from one edge to another along the stacked direction of battery stack 2. Each of the ends of bind bar 4 preferably has no L-shaped bend in cross section.

As illustrated in FIGS. 1 and 2, bind bars 4 extend along the stacked direction of battery stack 2 and are each fixed, at their ends, to end plates 3 disposed respectively at the end faces of battery stack 2, thus binding battery stack 2 in the stacked direction via end plates 3. Each bind bar 4 is a metal sheet that runs along the side face of battery stack 2 and has a predetermined width and a predetermined thickness, and is disposed to face the side face of battery stack 2. Bind bar 4 has through holes that each serve as locking hole 4a allowing insertion of bolt 5A, which is securing pin 5. For bind bar 4, a sheet made of metal such as iron, preferably a steel plate can be used. Bind bar 4 is made by bending the metal sheet into a predetermined shape in press forming or the like.

Bind bar 4 is provided with, along an upper end of an intermediate section of bind-bar principal surface 41 that is positioned between end sections of bind-bar principal surface 41, upper-surface-side bent part 44 that holds an upper surface of battery stack 2. Bind bar 4 is also provided with lower-surface-side bent part 45 that holds a lower surface of battery stack 2. Bind-bar principal surface 41 is rectangular and is of the size to cover battery stack 2 and end plates 3, which are disposed respectively at the ends of battery stack 2, substantially in their entirety. In FIG. 1, bind-bar principal surface 41 closely covers the side face of battery stack 2 substantially in its entirety. However, the bind-bar principal surface may be provided with one or more openings so that the side face of the battery stack is partly exposed. If the opening is formed in the bind-bar principal surface, the battery stack can be exposed for air cooling or can be supplied with cooling gas. Even if the cooling gas does not need to be supplied to the bind-bar principal surface through the opening, the bind-bar principal surface may be formed with the opening. With this structure, the bind bar can be lighter in weight.

Upper-surface-side bent part 44 holds the respective upper surfaces of prismatic battery cells 1 of battery stack 2, thus suppressing a vertical shift in position of the terminal surface of each prismatic battery cell 1. Lower-surface-side bent part 45 holds the lower surface of battery stack 2 and respective bottom faces of end plates 3 so that prismatic battery cells 1 and end plates 3 have their respective bottom faces disposed on the same plane. Illustrated lower-surface-side bent part 45 is formed with fixing holes used to fix bottom plate 17 disposed under battery stack 2 and end plates 3.

Insulating sheet 16 is disposed inwardly of bind-bar principal surface 41 and upper-surface-side bent part 44 of bind bar 4 and insulates prismatic battery cells 1 of battery stack 2 from bind bar 4. Bottom plate 17 with insulation quality is disposed in position under battery stack 2 and end plates 3 of FIG. 2 battery module 10 by means of lower-surface-side bent parts 45.

(Reinforcement 7)

The inner surface of each end of each bind bar 4 illustrated in FIGS. 2 and 4 has reinforcement 7 fixed in an area facing end plate 3A. End plate 3A is connected to bind bar 4 via this reinforcement 7. Reinforcement 7 disposed at each end of bind bar 4 enables end plate 3A to be stably fixed without causing an increase in thickness of bind bar 4 itself.

Each reinforcement 7 is made of metal. Reinforcement 7 is preferably made of the same metal as bind bar 4 or a metal having high rigidity compared with that used for bind bar 4. Reinforcements 7 are preferably formed integrally with bind bar 4. In order for bind bar 4 to have different shapes, difference materials, and different thicknesses, a tailored blank, for example, is used. Thus reinforcements 7 and bind bar 4 can be made as a single member. Alternatively reinforcements 7 may be individually prepared and welded to bind bar 4. With reinforcements 7 welded to bind bar 4 in advance, an assembly process can therefore be simplified.

Each reinforcement 7 includes joining recesses 7A that each allow, for connection, insertion of projection 14 projecting from each of the sides of end plate 3A. Reinforcement 7 illustrated in FIG. 4 has joining recesses 7A each serving as a through hole. Projection 14 is inserted in this through hole, so that bind bar 4 and end plate 3A are connected to each other. Each joining recess 7A that allows insertion of projection 14 has an inside diameter that is substantially equal to, that is to say, slightly larger than an outside diameter of projection 14. The thickness of reinforcement 7 is substantially equal to or slightly smaller than a projecting amount of projection 14 so that projection 14 is passed through reinforcement 7, but not through bind bar 4. Bolt head 5a of bolt 5A, which is securing pin 5, has an outside diameter that is larger than the inside diameter of joining recess 7A (or the outside diameter of projection 14). Reinforcement 7 fixed to bind bar 4 is pinched between side wall 12A of end plate 3A and bolt head 5a of each bolt 5A. Thus bind bar 4 is fixed to end plate 3A. Locking hole 4a of illustrated bind bar 4 has an inside shape that is larger than the outside shape of bolt head 5a. Bolt head 5a of bolt 5A screwed into end plate 3A is closely fitted, at its inner surface, to a surface of reinforcement 7. This structure enables the bolt head to project less from bind bar 4, so that the battery module can have a small outside diameter. It is to be noted, however, that the inside shape of the locking hole of the bind bar may be smaller than the outside diameter of the bolt head. In this structure, the bind bar is pinched between the leading surface of the projection and the bolt head, thus being fixed to the end plate.

The reinforcements are not necessarily necessary. The inner surface of the bind bar may be fixed, at each of the end sections of the bind-bar principal surface, directly to the side of the end plate. In this case, no projections project from the sides of the end plate, the sides of the end plate are both flat, and the inner surface of the bind bar is fixed, at each of the end sections of the bind-bar principal surface, to each of the sides of the end plate by abutment. Alternatively, with the projections projecting from the sides of the end plate, each of the ends of the bind bar has the open locking holes each having the inside shape that guides the projection, and with the projection inserted in the locking hole, the securing pin is inserted in the projection to fix the bind bar to the end plate.

The above-described structure in which projections 14 projecting from the sides of each end plate 3A are each locked via reinforcement 7 or directly to bind bar 4 enables a load associated with expansion of prismatic battery cells 1 to be applied linearly to bind bars 4. In other words, the load is received along a direction that pulls each bind bar 4 in the structure. Therefore, battery stack 2 can be bound with the rigidity increased.

Second Exemplary Embodiment

Figure 5:
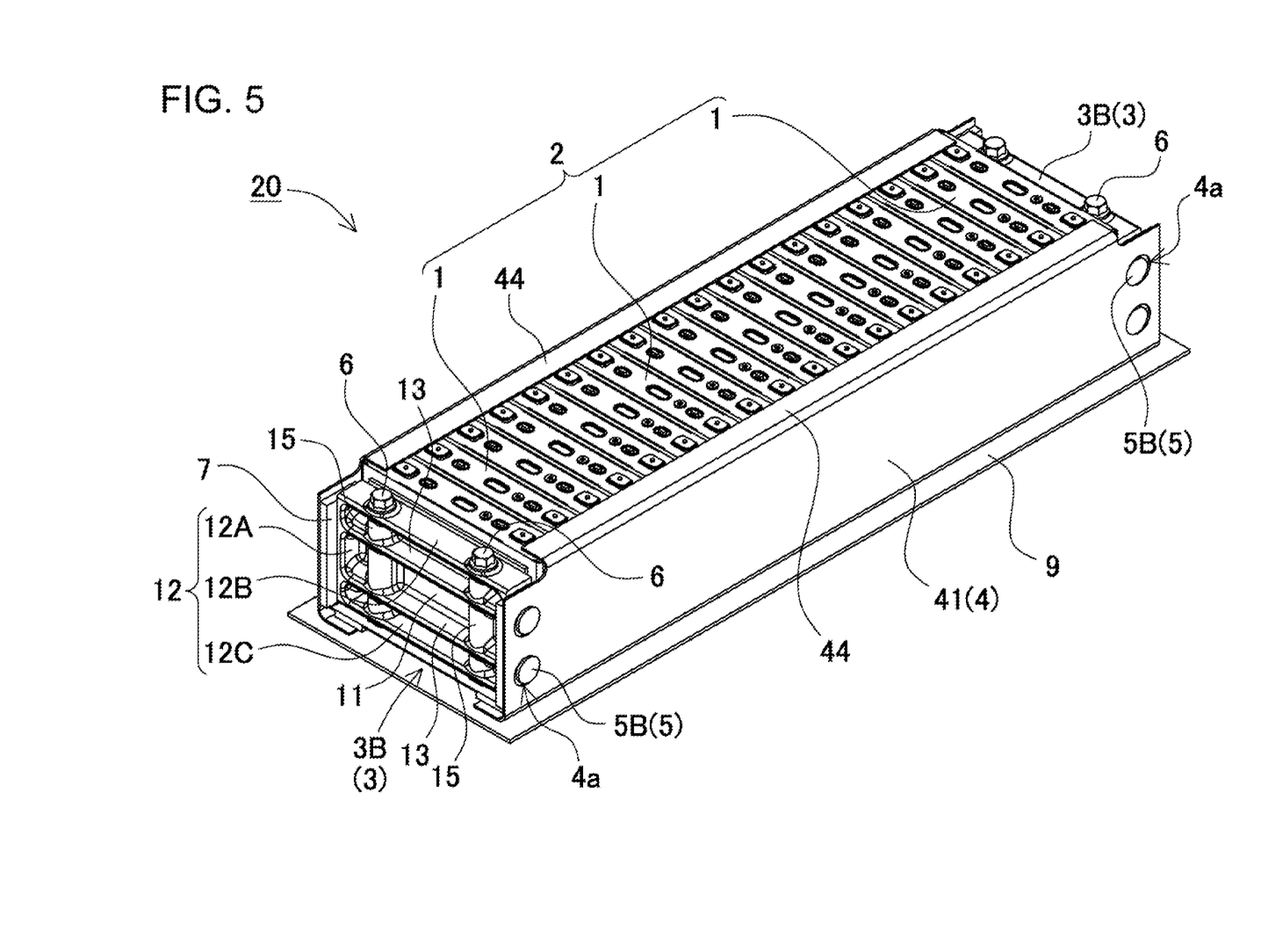
FIG. 5 is a perspective view of a battery module according to a second exemplary embodiment of the present invention.
Figure 6:
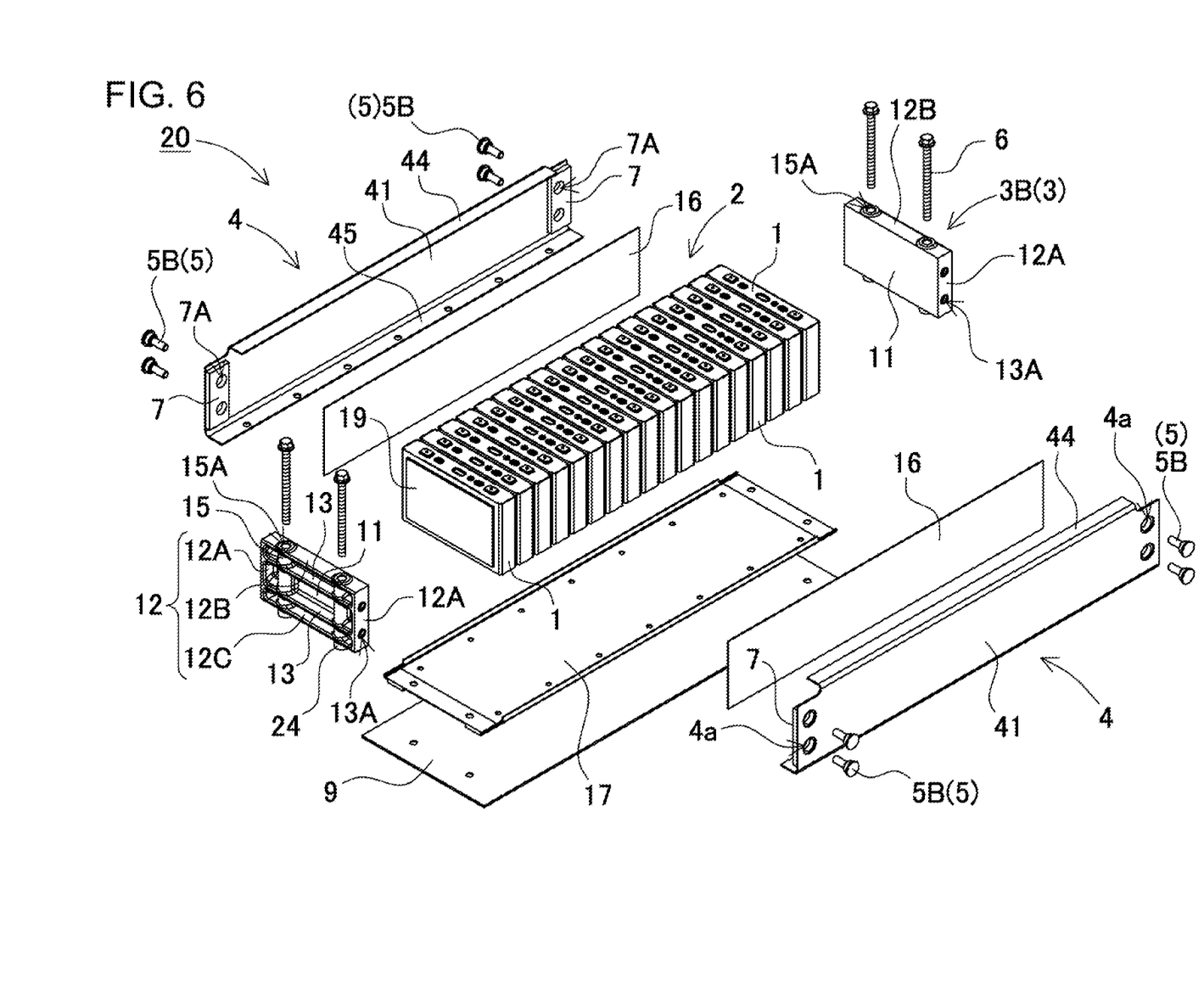
FIG. 6 is an exploded perspective view of the FIG. 5 battery module.
Figure 7:
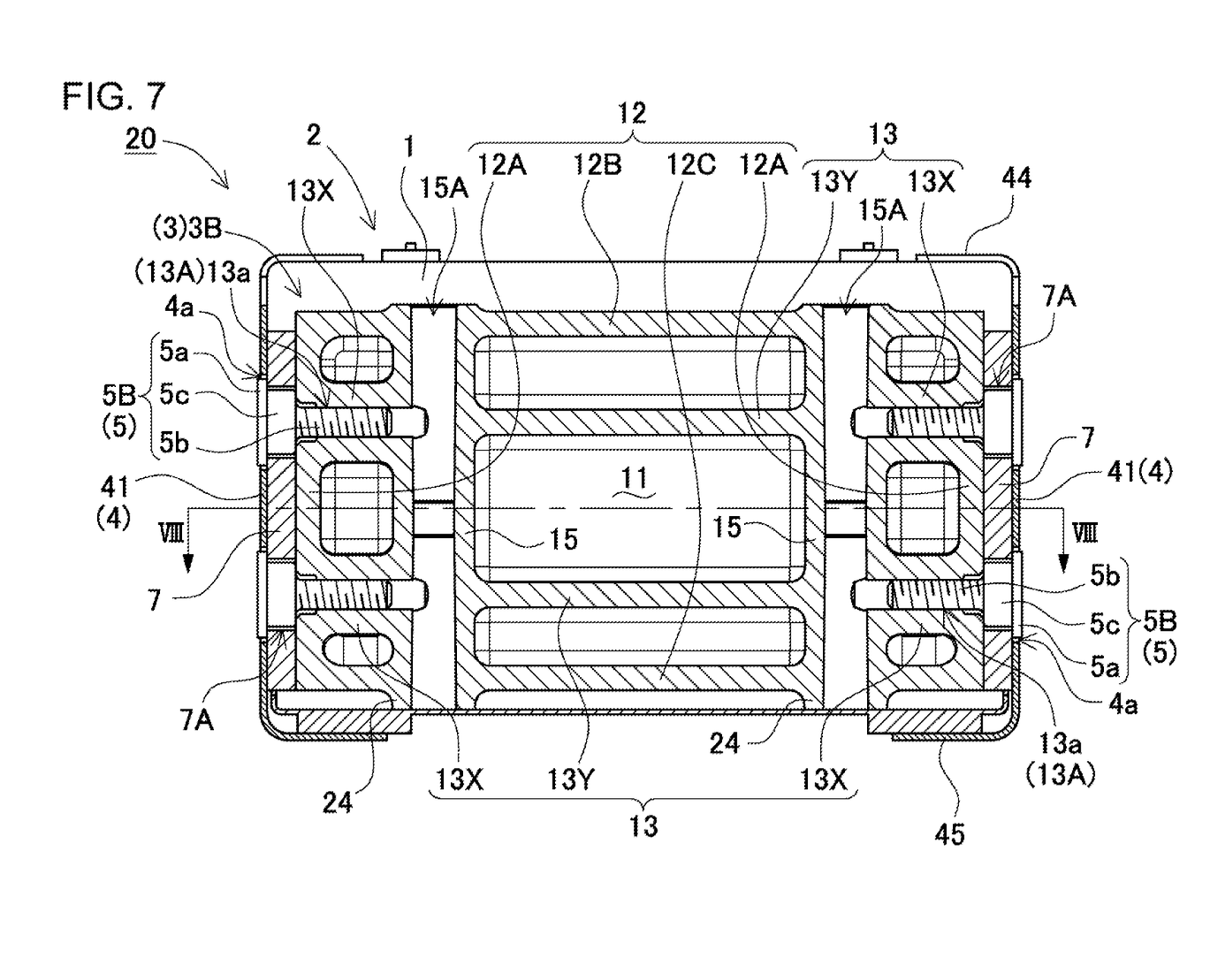
FIG. 7 is an enlarged vertical section of an end plate of the FIG. 5 battery module and corresponds to a section taken along line VII-VII in FIG. 8.
Figure 8:
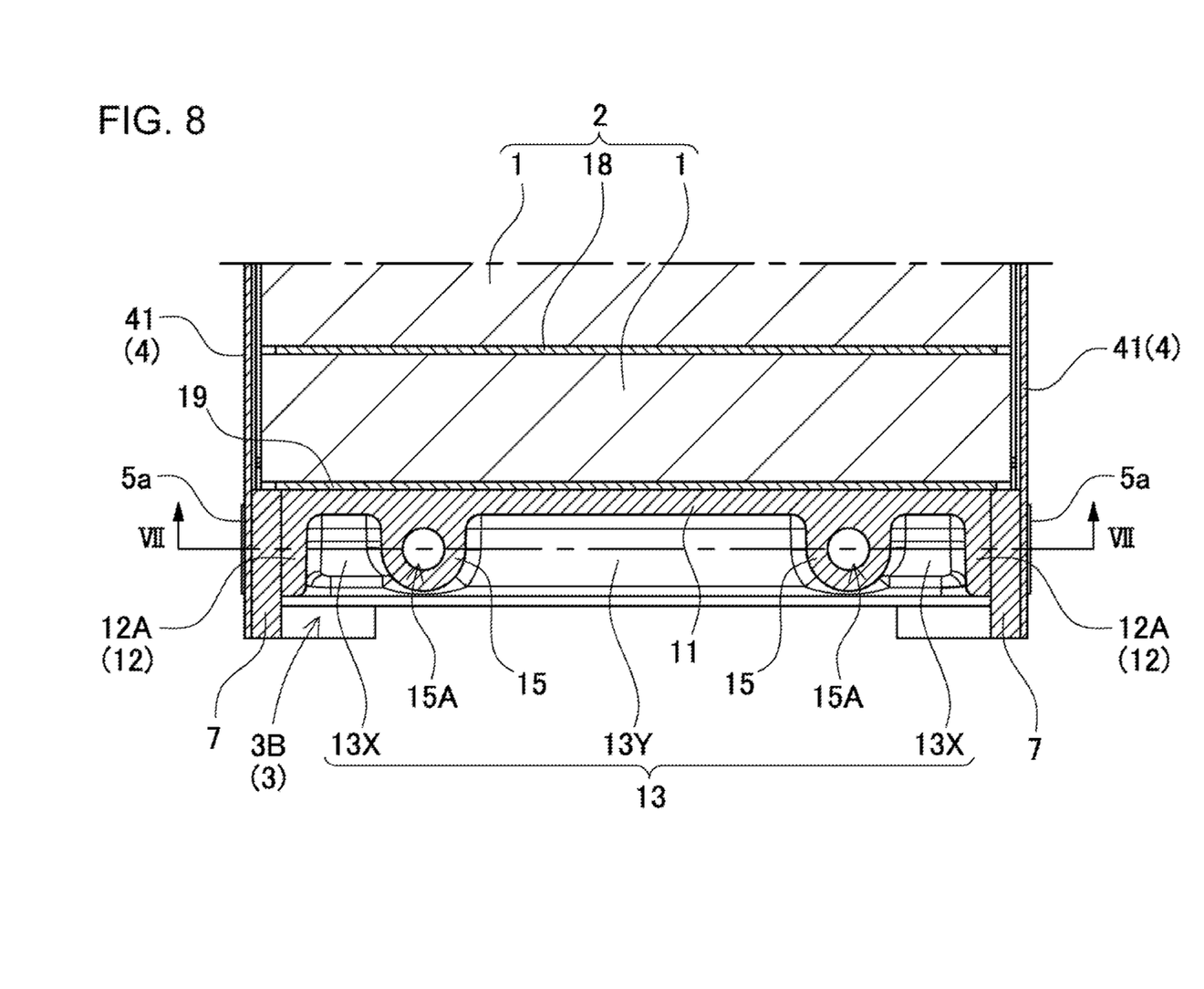
FIG. 8 is an enlarged horizontal section of the end plate of the FIG. 5 battery module and corresponds to a section taken along line VIII-VIII in FIG. 7.

In each of the above-described examples of the first exemplary embodiment, end plate 3 is provided with horizontally extending horizontal ribs 13. However, the end plate may be provided with, in addition to the horizontal ribs, vertically extending vertical ribs that intersect the horizontal ribs. Such an example is illustrated as the second exemplary embodiment by FIGS. 5 to 8. FIG. 5 is a perspective view of a battery module. FIG. 6 is an exploded perspective view of the battery module. FIG. 7 is a vertical, transverse section of an end of the battery module taken on a vertical plane. FIG. 8 is a horizontal section of the battery module's end taken on a horizontal plane. Battery module 20 illustrated in these drawings has substantially the same structure as the above-described battery module of the first exemplary embodiment except for structure of end plate 3B and end plate fixing structure. Therefore, constituent elements similar to those of above-described battery module 10 have the same reference marks and thus are not described in detail.

Battery module 20 illustrated in these drawings includes battery stack 2 that includes a plurality of prismatic battery cells 1 stacked with each of separators 18 made of insulating material being put between prismatic battery cells 1, a pair of end plates 3B holding battery stack 2 in position respectively at end faces of battery stack 2, bind bars 4 connecting the pair of end plates 3B, securing pins 5 fixing bind bars 4 over sides of each of end plates 3, and fixing bolts 6 fixing each of end plates 3B to base plate 9 disposed at a bottom face of battery module 20.

(End Plate 3B)

End plate 3B illustrated in FIGS. 7 and 8 has vertically extending vertical ribs 15 formed integrally with facing plate part 11. Two vertical ribs 15 of illustrated end plate 3B are separated in the side-to-side direction and parallel each other. Vertically extending vertical ribs 15 intersect horizontally extending horizontal ribs 13. End plate 3B having this structure can deliver even increased strength against bending by having vertically and horizontally intersecting vertical and horizontal ribs 15 and 13. Two vertical ribs 15 of illustrated end plate 3B are provided on an inner side of peripheral wall 12. Two vertical ribs 15 are parallel to side walls 12A positioned in the side-to-side direction and are spaced a predetermined distance away from each other. Each of vertical ribs 15 formed on the inner side of peripheral wall 12 has an upper end and a lower end that connect integrally with top wall 12B and bottom wall 12C, respectively. In FIG. 7, the lower end of vertical rib 15 of end plate 3B projects downward from a lower surface of bottom wall 12C to serve as projection 24. As illustrated in FIG. 7, a lower edge of projection 24 of end plate 3B is disposed flush with lower end faces of prismatic battery cells 1, so that a lower edge of facing plate part 11 is disposed above the lower end faces of prismatic battery cells 1. In this way, a lower end of facing plate part 11 is prevented from facing a lower end of prismatic battery cell 1.

As FIG. 7 illustrates, each vertical rib 15 also includes insertion hole 15A passing through vertical rib 15 along an axis of vertical rib 15. As illustrated in FIG. 2, end plate 3B has fixing bolts 6 that are each inserted in insertion hole 15A of vertical rib 15 to fix end plate 3B to base plate 9. This structure enables vertical ribs 15 reinforcing end plate 3B to also serve as members each allowing insertion of fixing bolt 6. Therefore, without a special insertion member, reduced manufacturing costs can be achieved. Respective open insertion holes 15A of vertical ribs 15 can make end plate 3B lighter in overall weight.

In end plate 3B including vertical ribs 15 each having insertion hole 15A, insertion hole 15A of each vertical rib 15 and joining hole 13A of each horizontal rib 13 are positioned in the same plane as illustrated in FIG. 7. This shortens an interaxis distance between insertion hole 15A and joining hole 13A along the stacked direction of prismatic battery cells 1. Thus end plate 3B can have a reduced thickness. Joining hole 13A is horizontally bored through the side of illustrated end plate 3B and reaches insertion hole 15A, thus communicating with insertion hole 15A. With joining hole 13A thus passing through and reaching insertion hole 15A, insertion hole 15A can be in close proximity to joining hole 13A. This means that insertion holes 15A can be disposed respectively about the sides of end plate 3B. Joining hole 13A may be provided with female threaded hole 13a that is obtained by threading a bored pilot hole reaching insertion hole 15A. This female threaded hole 13a has such a depth as to extend partway through joining hole 13A, not reaching insertion hole 15A.

The sides of above end plate 3B are both flat and are each provided with joining holes 13A. As FIG. 7 illustrates, bolt 5B which is securing pin 5 passed through bind bar 4 is screwed into female threaded hole 13a, thus connecting bind bar 4 to end plate 3B. Illustrated bolt 5B includes, at a rear end of male thread 5b, engagement part 5c that engages in joining recess 7A of reinforcement 7 fixed to an inner surface of bind bar 4. Bolt head 5a of this bolt 5B has an outside diameter that is larger than an inside diameter of joining recess 7A. Reinforcement 7 fixed to bind bar 4 is pinched between the side of end plate 3A and bolt head 5a of bolt 5B. Thus bind bar 4 is fixed to end plate 3A.

(Fixing Bolt 6)

By means of fixing bolts 6 that are each passed vertically through insertion hole 15A provided in vertical rib 15 of end plate 3B, battery module 20 illustrated in FIGS. 5 and 6 is fixed to base plate 9 disposed at the bottom face of battery module 20. A leading end of a threaded part of each fixing bolt 6 is screwed into a nut part (not illustrated) provided outwardly of base plate 9 or into a female threaded hole provided in base plate 9.

Figure 10:
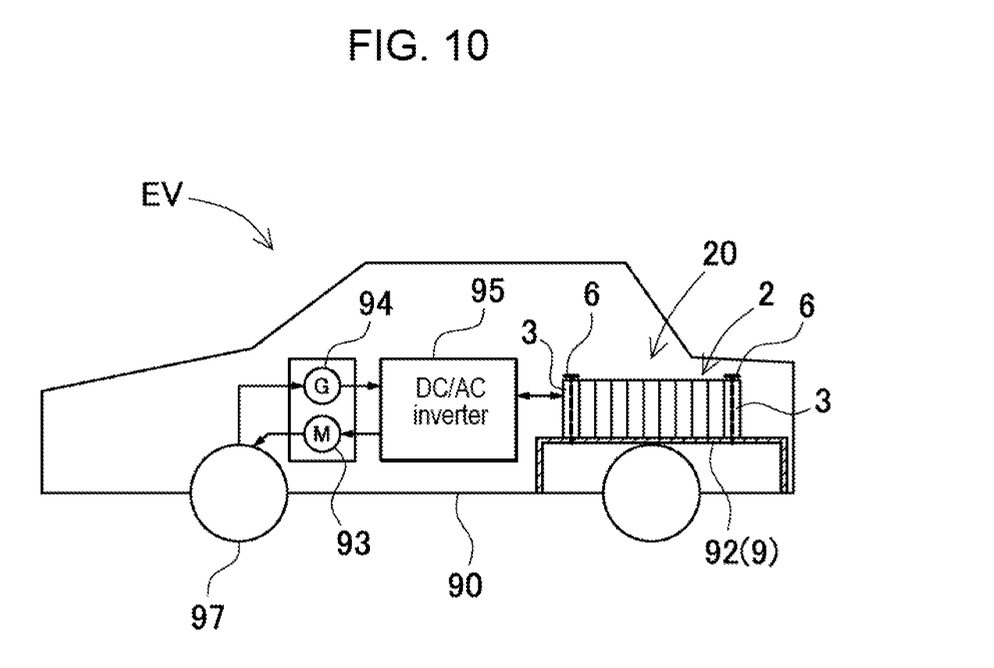
FIG. 10 is a block diagram illustrating an example in which the battery module is mounted to an electric vehicle that is driven only by a motor.

While being mounted on an upper surface of base plate 9, above battery module 20 is fixed in place to base plate 9 with fixing bolts 6 passed through end plate 3 and screwed into base plate 9. Base plate 9 is a plate to which battery module 20 is fixed. In an example in which battery module 20 is mounted to a vehicle, base plate 9 may be a frame that is fixed to the vehicle, such as a chassis. Battery module 20 mounted to the vehicle has each fixing bolt 6 inserted in insertion hole 15A of vertical rib 15 of end plate 3 with the leading end of fixing bolt 6 screwed into a female threaded hole (not illustrated) of the chassis. In this way, battery module 20 is fixed to the chassis of the vehicle. Fixing bolts 6 firmly fix end plates 3 to the chassis. This structure in which fixing bolts 6 are passed through end plates 3 and are fixed directly to chassis 92 of the vehicle as illustrated in FIG. 10 enables battery module 10 to be very firmly fixed to the vehicle.

(Vehicle Including Battery Module)

Each of the above-described battery modules is best used as a power source that supplies electric power to a motor which drives an electrically driven vehicle. Available examples of the electrically driven vehicle mounted with the battery module include a hybrid or a plug-in hybrid vehicle that is driven both by an engine and by a motor, and an electric vehicle that is driven only by a motor. The battery module is used as the power source in each of these vehicles. In order to provide electric power that drives the vehicle, a large-capacity, high-output power supply device may be mounted and may include a plurality of the above-described battery modules that are connected in series or parallel, and a control circuit that is a necessary addition.

Figure 9:
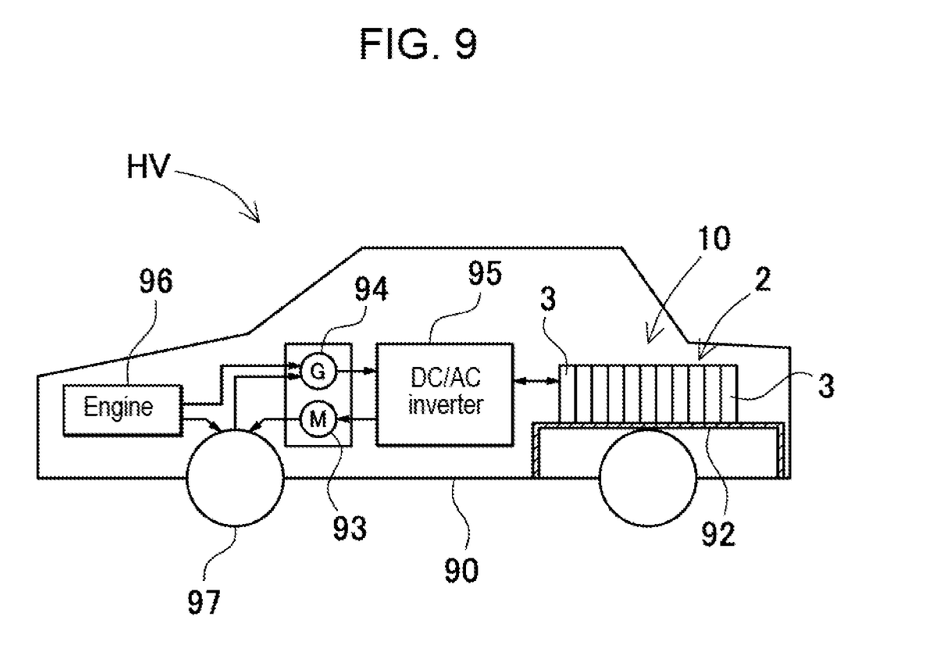
FIG. 9 is a block diagram illustrating an example in which the battery module is mounted to a hybrid vehicle that is driven by an engine and a motor.

FIG. 9 illustrates an example in which battery module 10 according to the first exemplary embodiment is mounted to a hybrid vehicle that is driven both by an engine and by a motor. Illustrated vehicle HV mounted with battery module 10 includes engine 96 and traction motor 93 that cause vehicle HV to run, battery module 10 that supplies electric power to motor 93, electric generator 94 that charges those battery cells of battery module 10, vehicle body 90 mounted with engine 96, motor 93, battery module 10, and electric generator 94, and wheels 97 that are driven by engine 96 or motor 93 to run vehicle body 90. Battery module 10 is connected to motor 93 and electric generator 94 via direct current to alternating current (DC-AC) inverter 95. Vehicle HV is driven both by motor 93 and by engine 96 while the prismatic battery cells of battery module 10 charge and discharge. Motor 93 is driven to drive the vehicle when engine efficiency is low, for example, during acceleration or on a low speed run. Motor 93 is driven when electric power is supplied from battery module 10. Electric generator 94 is driven by engine 96 or by regenerative braking that is caused when the vehicle brakes, thus charging the battery cells of battery module 10.

FIG. 10 illustrates an example in which battery module 20 according to the second exemplary embodiment is mounted to an electric vehicle that is driven only by a motor. Illustrated vehicle EV mounted with battery module 20 includes traction motor 93 that causes vehicle EV to run, battery module 20 that supplies electric power to motor 93, electric generator 94 that charges those battery cells of battery module 20, vehicle body 90 mounted with motor 93, battery module 20, and electric generator 94, and wheels 97 that are driven by motor 93 to run vehicle body 90. Battery module 20 is connected to motor 93 and electric generator 94 via DC-AC inverter 95. Motor 93 is driven when electric power is supplied from battery module 10. Electric generator 94 is driven by energy caused during regenerative braking of vehicle EV and charges the prismatic battery cells of battery module 20.

INDUSTRIAL APPLICABILITY

A battery module according to the present invention can be suitably used in a power supply device for a hybrid vehicle, a plug-in hybrid vehicle, an electric vehicle, or the like.

The invention claimed is:

1. A battery module comprising:
  a battery stack that includes a plurality of prismatic battery cells stacked in a direction along thicknesses of the plurality of prismatic battery cells;
  a pair of end plates disposed respectively at end faces of the battery stack that face in a stacked direction;
  bind bars disposed respectively on side faces of the battery stack, the bind bars binding the pair of end plates together; and
  a plurality of securing pins fixing the bind bars over sides of each of the pair of end plates,
  wherein
  a pair of the plurality of securing pins are fixed respectively to the sides of each of the pair of end plates to face each other and are coaxial with each other, and
  each of the pair of end plates includes a horizontal rib extending coaxially with each of the plurality of securing pins.

2. The battery module according to claim 1, wherein:
  the horizontal rib includes, at each of ends of the horizontal rib, a boss allowing insertion of each of the plurality of securing pins;
  the boss includes a joining hole allowing insertion of each of the plurality of securing pins; and each of the plurality of securing pins is passed through each of the bind bars and is inserted in the joining hole to connect each of the bind bars to each of the pair of end plates.

3. The battery module according to claim 1, wherein each of the pair of end plates includes a plurality of the horizontal ribs paralleling each other, with a plurality of the pairs of the plurality of securing pins fixed to the sides of each of the pair of end plates.

4. The battery module according to claim 1, wherein:
each of the pair of end plates further includes:
a facing, plate part having an outline substantially identical with a shape of each of the end faces of the battery stack; and
a peripheral wall projecting from four sides of the facing plate part along the stacked direction of the plurality of prismatic battery cells; and
each of the pair of end plates is substantially box-shaped as a whale.

5. The battery module according to claim 4, wherein:
the peripheral wall includes:
side walls connected respectively to side edges of the facing plate part;
a top wall connected to an upper edge of the facing plate part; and
a bottom wall connected to a lower edge of the facing plate part;
the horizontal rib protrudes from the facing plate part along the stacked direction of the plurality of the prismatic battery cells and connects with the side walls at ends of the horizontal rib; and
each of the side walls includes a joining hole allowing insertion of each of the plurality of securing pins.

6. The battery module according to any claim 1,
wherein each of the pair of end plates further includes a vertical rib that extends vertically and intersects the horizontal rib.

7. The battery module according to claim 6, further comprising
a fixing bolt fixing each of the pair of end plates to a base plate disposed at a bottom face of the battery module, wherein
the vertical rib includes an insertion hole passing through the vertical rib along an axis of the vertical rib, and
the fixing bolt is inserted in the insertion hole of the vertical rib to fix each of the pair of end plates to the base plate.

8. The battery module according to claim 7, wherein:
the horizontal rib includes, at each of ends of the horizontal rib, a joining hole allowing insertion of each of the plurality of securing pins;
an insertion hole of the vertical rib and a joining hole of the horizontal rib are positioned in an identical plane; and
the joining hole passes through and reaches the insertion hole.

9. The battery module according to claim 1,
wherein each of the pair of end plates is cast in one of aluminum and au aluminum alloy.

10. A vehicle comprising:
the battery module according to claim 1;
a traction motor that is supplied with electric power from the battery module;
a vehicle body mounted with the battery module and the traction motor; and
a wheel that is driven by the traction motor to run the vehicle body.

* * * * *